W. L. CURTIS.
DIE FOR MAKING DOUBLE ENDED RIVETS.
APPLICATION FILED JUNE 6, 1918.
1,327,525.
Patented Jan. 6, 1920.
2 SHEETS—SHEET 1.
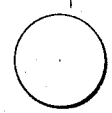
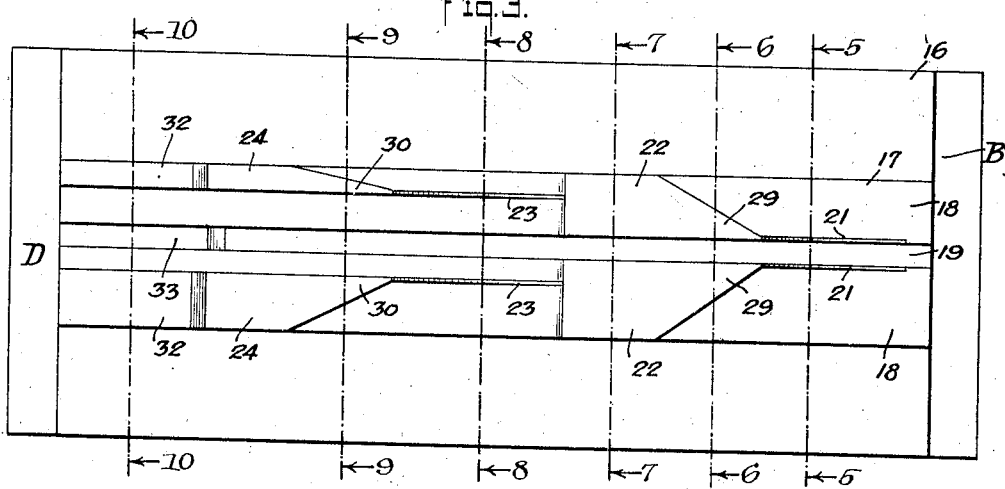
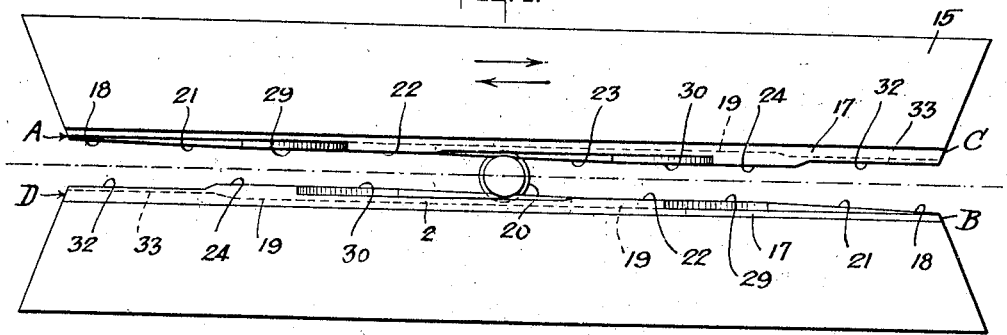
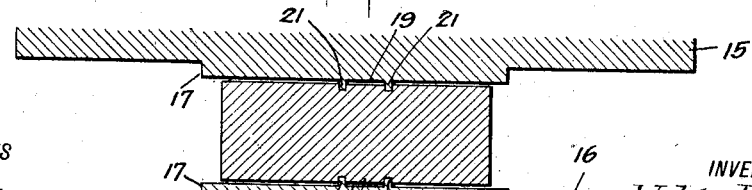
WITNESSES
INVENTOR
Walter L. Curtis
BY
ATTORNEYS

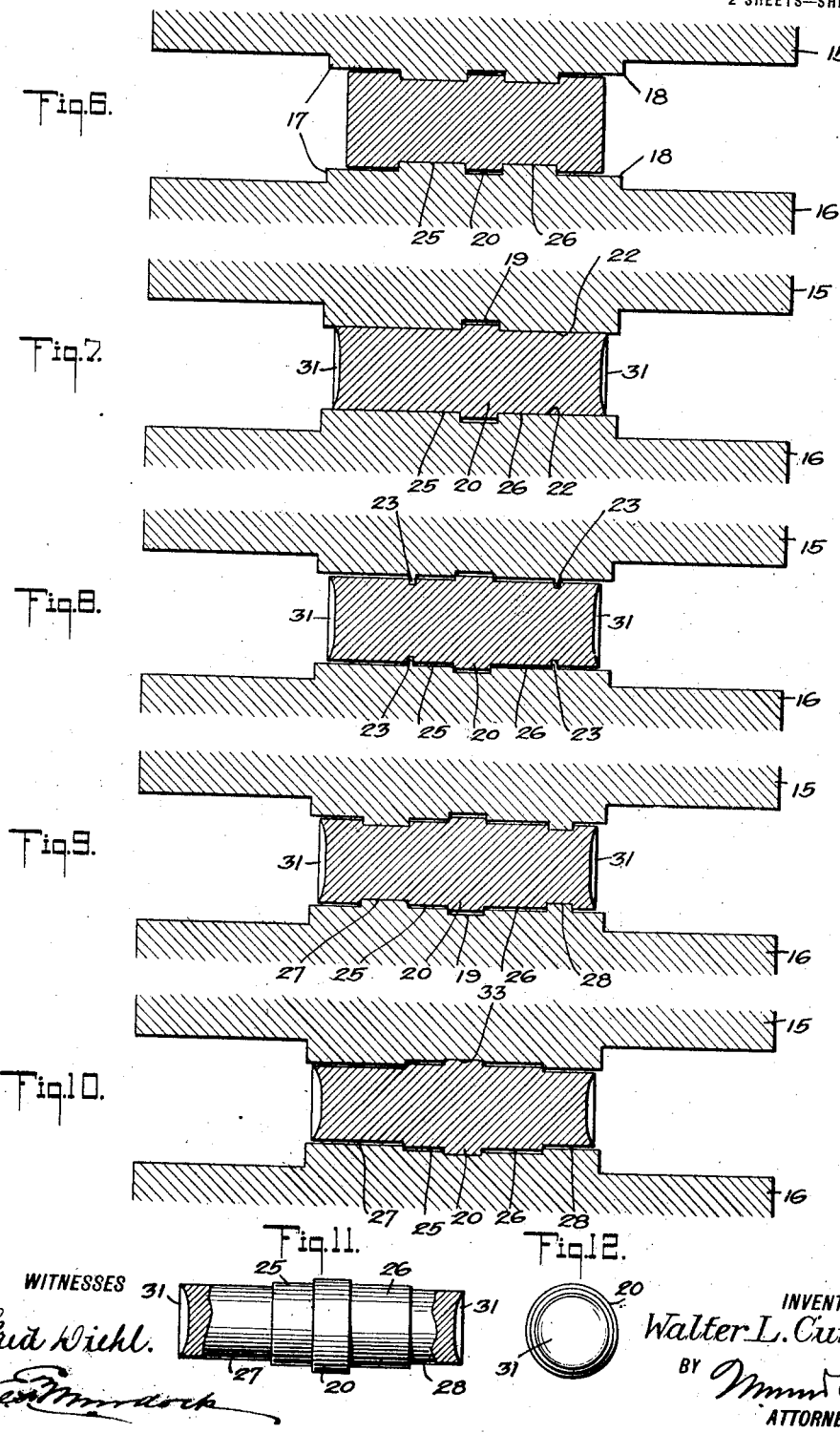

UNITED STATES PATENT OFFICE.

WALTER L. CURTIS, OF SPRINGFIELD, MASSACHUSETTS.

DIE FOR MAKING DOUBLE-ENDED RIVETS.

1,327,525.  Specification of Letters Patent.  Patented Jan. 6, 1920.

Application filed June 6, 1918. Serial No. 238,561.

*To all whom it may concern:*

Be it known that I, WALTER L. CURTIS, a citizen of the United States, and a resident of Springfield, in the county of Hampden and State of Massachusetts, have invented a new and Improved Die for Making Double-Ended Rivets, of which the following is a full, clear, and exact description.

Among the principal objects which the present invention has in view are: to reduce the time factor in making rivets of the character mentioned; to cheapen the cost of manufacture of said rivets; to shape the rivets to facilitate the heading thereof; and to secure greater accuracy in shapes imparted to said rivets.

*Drawings.*

Figure 1 is a side view on an enlarged scale, of a fragment of metal rod from which rivets are to be made;

Fig. 2 is an end view of the same;

Fig. 3 is a top plan view of a die plate for making the rivets, said plate being designed in conformity with the present invention;

Fig. 4 is an edge view showing coöperative die plates constructed and arranged in accordance with the present invention;
Figs. 5 to 10, inclusive, are sectional views showing fragments of the die plates and rivet-forming material therebetween, said plates being shown as arranged in serial order corresponding with the stages of forming the rivet;

Fig. 11 is a side view of the completed rivet formed from the section shown in Fig. 1 of the drawings, after the same has passed between the die plates and gone through the several stages illustrated in Figs. 5 to 10, inclusive;

Fig. 12 is an end view of the same.

*Description.*

Rivets such as referred to herein are such as those popularly employed in the manufacture of sprocket chains, watch and clock cases, and similar articles. A characteristic feature of such rivets is that they have a body portion intermediate the ends, the diameter of said ends being reduced to enter and extend through openings usually provided in plates, to be headed at the outer side thereof. A shoulder or rest for the said plates is usually formed on the rivets at the junction of the body or enlarged portion of the rivets and the reduced end portions.

Heretofore rivets of the character indicated have been made by what is known as screw machines or machines wherein the ends of the rivets have been reduced by cutters, or material-removing tools. The operations have generally been numerous and the attendance on the machines has been correspondingly large.

As distinguished from the operation of the screw machines, the dies shown in the drawings are such as employed in rolling either the rivets or the material from which the same are constructed under very great pressure, and certain sections, such as shown in Figs. 1 and 2, are fed between reciprocating dies at the receiving stations, to be delivered from them in shapes such as shown in Figs. 11 and 12.

As seen in the drawings, a reciprocating die plate 15 is moved past a stationary die plate 16, clearing the ends of the said plate 16 at both extremes of the movement of said plate 15. The faces of the plates 15 and 16 are embossed to provide die sections, such as 17. The die sections 17 have at the receiving ends thereof, tables 18. The tables 18 are divided by the grooves 19, which extend lengthwise of both plates and below the surface level thereof until toward the delivery ends of the plates, the bottoms of the grooves are raised slightly above the surface level of the table 18. The width of the grooves 19 corresponds with the width of the body 20 or largest portion of the rivet, as shown in Fig. 11 of the drawings. The body 20 is preliminarily separated from the portions forming the reduced ends, by tapered fins 21. The fins are raised above the tables 18 gradually, said fins beginning to rise from said tables near the receiving ends thereof, and continuing to extend upward from the level of said tables to the level of the tables 22. A second series of fins 23 are inclined upward from the surface levels of the tables 22 to the surface level of the third tables 24.

When employing three tables, such as 18, 22 and 24, respectively, of different levels, the dies produce reduced sections 25 and 26, and 27 and 28. As seen in the drawings and particularly as shown in Fig. 11 thereof, the reduced sections are disposed in pairs, which correspond in diameter, but which differ in length. Thus the sections 25 and 26 are of equal diameters, though the lengths of said sections differ. The sections 27 and 28 are formed to the same diameter but differ in length.

Heretofore die presses used for reducing the size of metal bars have compelled the metal to flow by pressing on the body thereof while holding the ends free. The movement of the metal under such conditions has been slow, requiring often many operations to obtain the desired result.

In the present invention, the result of the rolling operations on the tables 22 and 24, is aided by the wedge-shaped spreading sections 29 and 30.

When dies are shaped as shown in the drawings, the operation is as follows: The die plate 15 is swung to the right of the plate 16, until the receiving end A thereof is adjacent the receiving end B of the plate 16. A recess is formed in the machine at this point so that the section, such as shown in Fig. 1 of the drawings, is dropped between the two plates 15 and 16. Usually a rest is provided for holding the sections fed between the said plates so that said sections are delivered to the die sections correctly. When the die plate 15 is moved past the die plate 16, the rivet is rolled over the die plate 16 and the die section 17 thereon. At the completion of the movement of the plate 15, the heel end C thereof passes the heel end D of the plate 16, rolling the rivet over the end D of the plate 16 for delivery from the dies.

Referring to Fig. 3, it will be seen that adjacent the forward end of the plate 16, the metal bar from which the rivet is to be formed, is caught between the fins 21 on both plates 15 and 16. The fins 21 cut into the metal bar, as shown in Fig. 5 of the drawings. The plate 15 continuing to move, the metal bar is rolled over the tables 18, the said fins sinking deeper into the said bar until the sharp wedge points of the spreading sections are reached. The sections 29 are of the same level as the tables 22. The inclined edges of the sections 29 operate to crowd the surplus metal of the reduced ends from the level of the bottom of the grooves formed by the fins 21 beyond the sides of the die sections 17 and the tables 22.

In Fig. 6 of the drawings, the relation of the sections 29 to the bar being treated is shown. It will be noticed by reference to said figure, that the tables 18 have been lowered at this point to clear the extreme ends of the bar. The shearing action shown in this figure, continues until the ends rest on the tables 22, as shown in Fig. 7 of the drawings.

The continued movement of the plate 15 rolls the reduced section over the table 22 to perfect the cylindrical form of the sections 25 and 26 of the bar. While continuing to roll over the table 22, the bars roll on to the fins 23, as shown best in Fig. 8 of the drawings. The sections 25 and 26 and the reduced ends exterior to the fins continuing to advance the fins 23 are forced into the metal in the same manner as described with reference to the fins 21, and the spreading sections 30 engage the metal to the outside of the groove cut by the said fins 23, with the effect that the metal is crowded laterally to the extreme edge of the tables 24, thus forming the sections 27 and 28, and cupped ends 31 thereof.

It will be noted that during the rolling of the rivets between the plates, the said rivets have been in contact with surfaces at each side of the body 20, said surfaces being of equal diameters. By this is insured the direct travel of the rivet or bar forming the same. Also until the rivet reaches the end of the tables 24, the body 20 of the rivet has remained unrolled and relatively crude.

At the ends of the tables 24 are cut the lower levels 32. The lower levels 32 are removed from the sections 27 and 28, while a raised level 33 in the bottom of the groove 19 engages and rolls the body 20 of the rivet, until the rivet is delivered over the end D of the plate 16, completed in shape as shown in Figs. 11 and 12.

*Claims.*

1. A die plate for forming double ended rivets, said die plate being provided with a longitudinal groove and sets of rolling tables disposed upon opposite sides of the groove, the tables in each set being stepped up progressively, the tables in said sets being arranged in transverse pairs, each table having an inclined edge adapted to sweep the rivet from a point near the groove to the outer end of the same, and a plurality of fins carried by the plate and arranged at the reduced ends of the tables at the inclined edges thereof.

2. A die plate for forming double ended rivets, said die plate being provided with a longitudinal groove and sets of rolling tables disposed upon opposite sides of the groove, the tables in each set being stepped up progressively, the tables in said sets being arranged in transversely alined pairs, one transverse pair of tables being arranged outwardly with respect to the preceding pair of tables, each table having an inclined edge adapted to sweep the rivet from the starting point to the end thereof, and a plurality of substantially straight fins arranged at the forward ends of the inclined edges of the tables, said fins being arranged in transverse pairs.

WALTER L. CURTIS.